Dec. 18, 1923.

W. A. TURBAYNE 1,478,011

ELECTRICAL SYSTEM

Filed March 29, 1920

INVENTOR.
WILLIAM A. TURBAYNE.
BY
Raymond H. Van Vleet
ATTORNEY

Patented Dec. 18, 1923.

1,478,011

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

ELECTRICAL SYSTEM.

Application filed March 29, 1920. Serial No. 369,473.

*To all whom it may concern:*

Be it known that I, WILLIAM A. TURBAYNE, a citizen of the United States, residing at Niagara Falls, in the county of Niagara and State of New York, have invented new and useful Improvements in Electrical Systems, of which the following is a specification.

The present invention relates to electrical systems.

More particularly the present invention relates to electrical systems wherein a generator which is subject to wide variations in speed is used to supply current to a storage battery and to a translation circuit. When the generator is inoperative to develop a predetermined voltage, the battery discharges to supply the demands of said translation circuit.

An object of the present invention is to provide a novel system in which the generator will be regulated to hold the functions of the generator within predetermined limits regardless of speed variations.

A further object is to provide an improved electrical system in which the generator is regulated to maintain a substantially constant voltage and in which excess current flow will be prevented.

Further objects will appear as the description proceeds.

Referring to the drawings—

Figure 1:
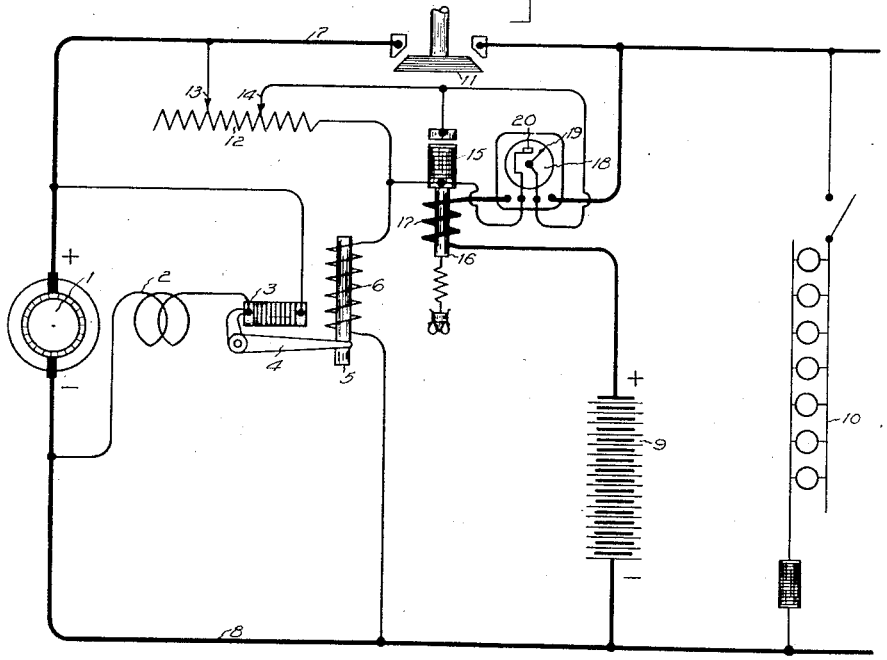
Fig. 1 represents one embodiment of the present invention.

Referring first to Fig. 1, the armature of a variable speed generator is indicated by the numeral 1. Connected across the terminals of said armature 1 is the shunt field winding 2, which shunt field winding 2 has in series therewith the variable pressure rheostat 3. The resistance of the rheostat 3 may be controlled by the bell crank lever 4 which moves in response to the plunger 5. Said plunger 5 is controlled by the solenoid 6, the novel connections of which will be described hereinafter.

The armature 1 is connected to supply mains 7 and 8, across which mains are connected in parallel branches the circuit containing the storage battery 9 and the translation circuit 10. An automatic switch 11 is shown in diagrammatic form in the main 7. Such automatic switches are well known and need not be described herein. It will be sufficient to state that said switch 11 should close automatically when the armature 1 is developing a predetermined voltage. When the armature 1 is inoperative to develop said predetermined voltage, the automatic switch 11 will be open.

The controlling winding 6 for the shunt field rheostat 3 is connected across the mains 7 and 8 through the adjustable resistance 12. The amount of resistance 12 included in circuit with coil 6 may be adjusted by moving the slider 13. A second slider 14 will be provided, across which and the right hand end of the resistance 12 may be bridged the compressible rheostat 15. Said compressible rheostat 15 may be controlled by plunger 16 which in turn responds to the energization of the coil 17 connected in series with the storage battery 9. Said plunger 16 will be biased to cause compressible rheostat 15 to have a maximum resistance. Under normal conditions the short circuit around that part of the resistance 12 which lies to the right of slider 14 may be actually open-circuited.

Also connected in series with the battery 9 is the integrating meter 18. This meter has the purpose of measuring the ampere hours delivered to or delivered from the storage battery. Said meter should be designed to operate at a different rate on discharge than when current is being sent through in the charging direction. Such meters are well known and need not be described in detail herein. It should be stated, however, that the meter 18 may be calibrated to compensate for the fact that the storage battery has an efficiency of less than 100% so that said meter will, at all times indicate the net state of charge of the storage battery. Said meter 18 may be provided with a movable contact 19 and a stationary contact 20. Said contacts, when in engagement, close a short circuit, through slider 14, of that part of resistance 12 to the right of said slider 14.

A mode of operation of the system disclosed in Fig. 1 is substantially as follows:

When the armature 1 is inoperative or developing only a low voltage, automatic switch 11 will be open and the storage battery will supply the demands of the lamp circuit 10. As the armature 1 speeds up and develops a sufficiently high voltage, the automatic switch 11 will close and current will be delivered to the storage battery. If the armature 1 should tend to develop a higher voltage than is desired, the solenoid 6 will attract plunger 5 to increase the resistance of rheostat 3, thereby cutting down the energization of the field coil 2 and holding the voltage developed by armature 1 to a substantially constant value. If the storage battery should happen to be in a more or less discharged state, the voltage above referred to might result in the delivery to said battery of higher current than is desired. Relatively heavy current through coil 17 will result in the attraction of the plunger 16, whereby compressible rheostat 15 would have its resistance decreased. The net resistance in circuit with operating solenoid 6 of the field rheostat 3 will therefore be decreased and said plunger 5 will be attracted at a lower voltage across mains 7 and 8. The solenoid 6, with its associated circuits including the current-responsive rheostat 15, is to hold a substantially constant voltage across mains 7 and 8 unless said voltage would result in the delivery of too high current to the storage battery, in which case said voltage is held down to a value at which the input current to the storage battery does not exceed a dangerous value.

As charging current is delivered to the storage battery the movable contact 19 of the ampere hour meter will approach the fixed contact 20. When a predetermined number of ampere hours have been delivered to the storage battery, sufficient to fully charge the same, said contacts 19 and 20 will engage, thereby short-circuiting that part of the resistance 12 to the right of the slider 14. The resulting reduction in the resistance in circuit with operating solenoid 6 will cause a reduction in the voltage delivered by the armature 1. This reduced voltage will, in practice, be chosen as the floating voltage of the storage battery.

Figure 2:
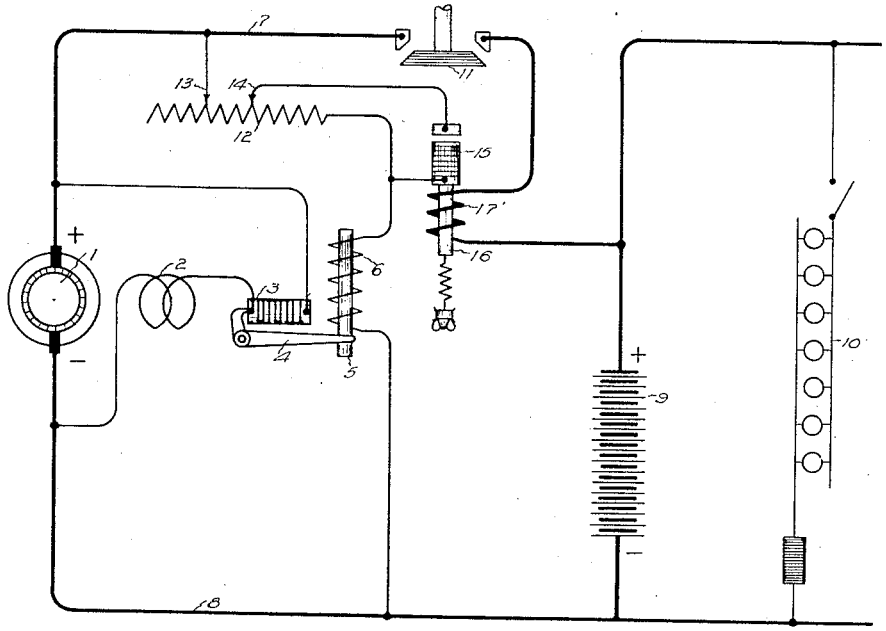
Fig. 2 represents a modified embodiment.

According to the system illustrated in Fig. 2, the rheostat 15 for varying the net resistance in circuit with solenoid 6 is operated by the current solenoid 17' which carries the total generator output current. No ampere hour meter is illustrated in the system shown in Fig. 2. It will be understood that the ampere hour meter may be omitted or employed, as preferred, whether the current solenoid is located in the main generator lead or in the battery branch.

According to the system disclosed in Fig. 2, the operating solenoid 6 will so control the field rheostat 3 as to maintain a substantially constant voltage, unless said voltage would, due for instance to a depleted battery, result in the delivery of too high a value of current, in which case the rheostat 15 will be operated to decrease the net resistance in circuit with operating solenoid 6 to hold a lower standard of voltage.

When the battery C. E. M. F. rises and approaches that value of generator voltage normally maintained by action of the solenoid 6, the current supplied to the battery will inherently fall off in value.

The illustrated embodiments of the present invention should not be construed in a limiting sense. Many modifications will occur to those skilled in the art. It is intended in this patent to cover all such modifications that come within the scope of the invention as defined by the appended claims.

What I claim as new and desire to secure by Letters Patent of the United States is—

1. In an electrical system, in combination, a variable speed generator, a field rheostat for said generator, a solenoid for governing said rheostat, a resistance, said solenoid being connected across said generator through said resistance, a normally open shunt circuit for varying the effect of said resistance, and current controlled means for first closing said shunt circuit and thereafter controlling said shunt circuit when the current in said current-controlled means exceeds a predetermined amount.

2. In an electrical system, in combination, a variable speed generator, a field rheostat for said generator, a solenoid for governing said rheostat, a resistance, said solenoid being connected across said generator through said resistance, a normally open shunt circuit for varying the effect of said resistance, and means responsive to a current function of said system for first closing and thereafter controlling said shunt circuit.

3. In an electrical system, in combination, a variable speed generator, a field rheostat for said generator, a solenoid for governing said rheostat, a resistance, said solenoid being connected across said generator through said resistance, a normally open shunt circuit for varying the effect of said resistance, and means for first closing and thereafter gradually changing the resistance of said shunt circuit.

In witness whereof, I have hereunto subscribed my name.

WILLIAM A. TURBAYNE.